(12) United States Patent
Sato et al.

(10) Patent No.: US 8,568,609 B2
(45) Date of Patent: Oct. 29, 2013

(54) LUBRICATING OIL COMPOSITION FOR REFRIGERATING MACHINE

(75) Inventors: Tokue Sato, Ichihara (JP); Masato Kaneko, Ichihara (JP); Harutomo Ikeda, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 361 days.

(21) Appl. No.: 12/744,448

(22) PCT Filed: Nov. 20, 2008

(86) PCT No.: PCT/JP2008/071101
§ 371 (c)(1),
(2), (4) Date: May 24, 2010

(87) PCT Pub. No.: WO2009/066722
PCT Pub. Date: May 28, 2009

(65) Prior Publication Data
US 2010/0234256 A1    Sep. 16, 2010

(30) Foreign Application Priority Data

Nov. 22, 2007    (JP) .................................. 2007-302931

(51) Int. Cl.
*C09K 5/04* (2006.01)

(52) U.S. Cl.
USPC ........................................................ 252/68

(58) Field of Classification Search
USPC ............................................................ 252/68
See application file for complete search history.

(56) References Cited

U.S. PATENT DOCUMENTS

| | | | | |
|---|---|---|---|---|
| 5,454,963 A * | 10/1995 | Kaneko | ......................... | 508/304 |
| 5,648,016 A | 7/1997 | Klug et al. | | |
| 7,413,674 B2 | 8/2008 | Singh et al. | | |
| 2006/0022166 A1* | 2/2006 | Wilson et al. | ................... | 252/68 |
| 2006/0043330 A1* | 3/2006 | Wilson et al. | ................... | 252/67 |
| 2008/0157022 A1 | 7/2008 | Singh et al. | | |

FOREIGN PATENT DOCUMENTS

| | | |
|---|---|---|
| EP | 1094100 A1 * | 4/2001 |
| JP | 3 52995 | 3/1991 |
| JP | 3 275799 | 12/1991 |
| JP | 4 81495 | 3/1992 |
| JP | 4 110388 | 4/1992 |
| JP | 5 17792 | 1/1993 |
| JP | 5 279658 | 10/1993 |
| JP | 6 1970 | 1/1994 |
| JP | 7 507342 | 8/1995 |
| JP | 10 8078 | 1/1998 |
| JP | 290 1369 | 6/1999 |
| JP | 2000 96075 | 4/2000 |
| JP | 2000 154390 | 6/2000 |
| JP | 2002 356694 | 12/2002 |
| JP | 2006 503961 | 2/2006 |
| JP | 2006 512426 | 4/2006 |
| JP | 2007 137953 | 6/2007 |
| JP | 2007 532767 | 11/2007 |
| JP | 2008 208261 | 9/2008 |
| WO | 92 17563 | 10/1992 |
| WO | 00 60021 | 10/2000 |
| WO | 2004 037752 | 5/2004 |
| WO | 2004 037913 | 5/2004 |
| WO | 2005 103190 | 11/2005 |
| WO | 2005 103191 | 11/2005 |
| WO | WO 2006/069362 A2 | 6/2006 |
| WO | WO 2006/069362 A3 | 6/2006 |
| WO | 2006 094303 | 9/2006 |
| WO | 2007 002625 | 1/2007 |
| WO | 2007 029746 | 3/2007 |
| WO | 2007 105452 | 9/2007 |

OTHER PUBLICATIONS

U.S. Appl. No. 12/919,412, filed Aug. 25, 2010, Sato, et al.
U.S. Appl. No. 12/744,285, filed May 21, 2010, Kaneko, et al.
Extended European Search Report issued Dec. 12, 2012 in Patent Application No. 08852087.9.

* cited by examiner

*Primary Examiner* — John Hardee
(74) *Attorney, Agent, or Firm* — Oblon, Spivak, McClelland, Maier & Neustadt, L.L.P.

(57) ABSTRACT

A lubricating oil composition for refrigerator is formed by adding an organic compound that includes a double bond in the molecule such as α-olefin or conjugated diene to a base oil. Capable of being stably used for a long time in the presence of oxygen, the lubricating oil composition for refrigerator according to the invention is suitable for an open-type car air-conditioner, an electric driven car air-conditioner, a gas heat pump, an air conditioning device, a refrigerator, a vending machine, a showcase, various hot-water supply systems or a heating/cooling system.

12 Claims, No Drawings

LUBRICATING OIL COMPOSITION FOR REFRIGERATING MACHINE

TECHNICAL FIELD

The present invention relates to a lubricating oil composition for refrigerator used in a compression freezer(s) of various freezer fields.

BACKGROUND ART

In general, a compression freezer includes a compressor, a condenser, an expansion valve and an evaporator. Within an enclosed system of the compression freezer, a liquid mixture of a refrigerant and lubricating oil is circulated. Examples of a refrigerant conventionally used in many of such compression freezers include dichlorodifluoromethane (R12) and chlorodifluoromethane (R22). Examples of the lubricating oil conventionally used therein are a variety of mineral oil and synthetic oil.

However, chlorofluorocarbon such as R12 and R22 mentioned above may bring about an environmental pollution such as destruction of the stratospheric ozone layer, a use of which has been more strictly regulated on a global scale in recent years. Thus, a hydrogen-containing chlorofluorocarbon compound such as hydrofluorocarbon or hydrochlorofluorocarbon is attracting more and more attentions as a new refrigerant. Such a hydrogen-containing chlorofluorocarbon compound, especially hydrofluorocarbon represented by R134a, is a preferable refrigerant for compression freezers not only because the compound does not destroy the ozone layer but also because the compound can be used in conventional freezers in place of R12 and the like with little change in configurations of freezers from those of the conventional freezers (e.g., see Patent Document 1).

Since hydrofluorocarbon may bring about an impact on the environment in terms of global warming, a so-called natural refrigerant such as carbon dioxide or ammonia is also attracting more and more attentions as an alternative refrigerant that is more suitable for environmental protection. Refrigerator oil using such a natural refrigerant has been also proposed (e.g., see Patent Document 2). In addition, a refrigerant having a specific polar structure in its molecule such as an unsaturated fluorohydrocarbon compound, a fluoroether compound, a fluoroalcohol compound or a fluoroketone compound has been found to have lower global warming potential (e.g., see Patent Document 3 and Patent Document 4).

Patent Document 1: JP-A-10-008078
Patent Document 2: JP-2000-96075
Patent Document 3: JP-T-2006-503961
Patent Document 4: JP-T-07-507342

DISCLOSURE OF THE INVENTION

Problems to be Solved by the Invention

However, the refrigerator oil disclosed in Patent Document 1 or 2 is not necessarily sufficiently superior in terms of energy saving. For instance, even when the refrigerator oil is used in a freezer such as an automobile air conditioner or an electric refrigerator, friction between an aluminum product and a steel product of the freezer remains large, which is problematic in terms of energy saving. In addition, since a great variety of refrigerants are in use as set forth above, it has been difficult to provide a single refrigerator oil that can be used with those refrigerants. Furthermore, although it is necessary that the lubricating oil for refrigerator utilized with the refrigerant disclosed in Patent Document 3 or 4 has excellent stability as well as excellent compatibility with the refrigerant, lubricating oil having sufficient stability has not been provided yet.

An object of the present invention is to provide a lubricating oil composition for refrigerator that provides excellent stability when implemented as refrigerator oil utilized in freezers which employ a variety of refrigerants such as an unsaturated fluorohydrocarbon compound that have a low global warming potential and are employed for a conventional automobile air conditioning system.

Means for Solving the Problems

In order to solve the above-mentioned problems, according to an aspect of the invention, lubricating oil compositions for refrigerator as follows are provided:

(1) a lubricating oil composition for refrigerator, comprising: a base oil; and an additive added to the base oil, in which the additive is an organic compound comprising a double bond in its molecule;

(2) the above-described lubricating oil composition for refrigerator, in which the organic compound is an unsaturated aliphatic compound;

(3) the above-described lubricating oil composition for refrigerator, in which the unsaturated aliphatic compound is α-olefin;

(4) the above-described lubricating oil composition for refrigerator, in which the unsaturated aliphatic compound comprises a conjugated double bond;

(5) the above-described lubricating oil composition for refrigerator, in which the organic compound is a compound selected from terpenes that comprise a double bond;

(6) the above-described lubricating oil composition for refrigerator, in which the lubricating oil composition for refrigerator is used for a refrigerant containing: at least one of fluorine-containing organic compounds selected from the compounds represented by the following molecular formula (A); or a combination of the fluorine-containing organic compound and saturated fluorohydrocarbon compound, $$C_pO_qF_rR_s \qquad (A)$$

where: R represents a Cl, Br, I or hydrogen atom, p is an integer in a range of 1 to 6, q is an integer in a range of 0 to 2, r is an integer in a range of 1 to 14, and s is an integer in a range of 0 to 13; and if q is 0, p is in a range of 2 to 6, and the molecule includes at least one carbon-carbon unsaturated bond;

(7) the above-described lubricating oil composition for refrigerator, in which the compound represented by the molecular formula (A) is a compound represented by at least one of molecular formulae $C_3HF_5$, $C_3H_2F_4$, and $C_3H_3F_3$, (8) the above-described lubricating oil composition for refrigerator, in which the base oil is mineral oil and/or synthetic base oil, and the synthetic base oil is at least one compound selected from a group consisting of alkyl benzene, alkyl naphthalene, poly-α-olefin, polyvinyl ether, polyalkylene glycol, polycarbonate, polyol ester and an ether-base compound represented by a formula (1) as follows, $$Ra\text{—}[(ORb)n\text{—}(B)\text{—}(ORc)k]x\text{-}Rd \qquad (1)$$

where: Ra and Rd each represent a hydrogen atom, an alkyl group having 1 to 10 carbon atoms, an acyl group having 2 to 10 carbon atoms or a hydrocarbon group having 2 to 6 bonding sites and 1 to 10 carbon atoms; Rb and Rc each represent an alkylene group having 2 to 4 carbon atoms; n and k each represent an integer in a range of 0 to 20; x represents an integer in a range of 1 to 6; (B) represents a polymerization site containing 3 or more monomer units each represented by a formula (2) as follows,

[Chemical Formula 1]

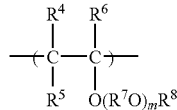
(2)

where: $R^4$, $R^5$ and $R^6$ each represent a hydrogen atom or a hydrocarbon group having 1 to 8 carbon atoms, $R^4$, $R^5$ and $R^6$ being allowed to be mutually the same or different; $R^7$ represents a divalent hydrocarbon group having 1 to 10 carbon atoms or divalent ether-bonded oxygen-containing hydrocarbon group having 2 to 20 carbon atoms; $R^8$ represents a hydrogen atom, a hydrocarbon group having 1 to 20 carbon atoms; m represents a number whose average value is in a range of 0 to 10; when m is plural, plural m may be mutually the same or different per each unit; $R^4$ to $R^8$ each may be mutually the same or different per each unit; when $R^7O$ is plural, plural $R^7O$ may be mutually the same or different; and when both k and n in the formula (1) are 0, m is an integer of 1 or larger in the formula (2);

(9) the above-described lubricating oil composition for refrigerator, in which the base oil is further added with at least one additive selected from a group consisting of an extreme pressure agent, an oiliness agent, an antioxidant, an acid scavenger, a metal deactivator and an antifoaming agent;

(10) the above-described lubricating oil composition for refrigerator, in which a slide portion of the refrigerator is made of engineering plastic or includes an organic coating layer or an inorganic coating layer;

(11) the above-described lubricating oil composition for refrigerator, in which the organic coating layer is a coating layer of polytetrafluoroethylene, a coating layer of polyimide, a coating layer of polyamide-imide or a thermosetting insulating layer formed with use of a resin paint containing: a resin base material made of polyhydroxyether resin and polysulfone-base resin; and a cross-linker;

(12) the above-described lubricating oil composition for refrigerator, in which the inorganic coating layer is a graphite layer, a diamond-like carbon layer, a tin layer, a chromium layer, a nickel layer, of a molybdenum layer;

(13) the above-described lubricating oil composition for refrigerator, the lubricating oil composition for refrigerator is used in an open-type car air-conditioner, an electric driven car air-conditioner, a gas heat pump, an air conditioning device, a refrigerator, a vending machine, a showcase, various hot-water supply systems or a heating/cooling system; and

(14) the above-described lubricating oil composition for refrigerator, in which a water content within the system is 500 ppm by mass or less while a residual air partial pressure is 13 kPa or less.

The lubricating oil composition for refrigerator according to an aspect of the invention includes an additive in the form of an organic compound having a double bond in the molecule thereof added to a base oil. Accordingly, a small amount of oxygen remaining in the freezer system can be scavenged, thereby preventing oxygen from reacting with the refrigerant. Therefore, the lubricating oil composition for refrigerator according to the aspect of the invention can be stably used for a long time.

The freezer lubricating oil composition according to the aspect of the invention is suitable for use in an application that employs an unsaturated chlorofluorocarbon refrigerant reactive particularly with oxygen such as an automobile air conditioner, an automobile air conditioner with electric motor driven compressor, a gas heat pump, an air conditioner, a refrigerator, a vending machine, a showcase, hot-water supply systems, or a heating and refrigerating system.

BEST MODE FOR CARRYING OUT THE INVENTION

A preferred embodiment for implementing the present invention will be described below.

A lubricating oil composition for refrigerator according to the invention is formed by adding an organic compound having double bond in the molecules to a base oil.

The base oil may be mineral oil or synthetic base oil. Examples of preferable synthetic base oil include at least one synthetic base oil selected from a group consisting of alkyl benzene, alkyl naphthalene, poly-α-olefin, polyvinyl ether, polyalkylene glycol, polycarbonate, polyol ester, and an ether compound represented by the formula (2).

First of all, the base oil will be described below.

1. Mineral Oil

The mineral oil is preferably highly-refined mineral oil, examples of which are: refined oil provided by refining oil fractions in accordance with an ordinary method; deeply-dewaxed oil provided by deeply dewaxing the refined oil fractions; and hydrotreated oil provided by hydrotreating the oil fractions, the oil fractions being provided by atmospherically distilling paraffin-base crude oil, intermediate-base crude oil or naphthene-base crude oil or by vacuum-distilling the residual oil of the atmospherically-distilled oil. The method of refining is not particularly limited but various methods may be employed.

In general, a treatment such as (a) hydrotreating, (b) dewaxing (solvent-dewaxing or hydrodewaxing), (c) solvent-extracting, (d) alkali-distilling or sulfate-cleaning or (e) clay-treating is singularly performed, or plural methods thereof are combinationally performed in a suitable order. In addition, performing the same treatment plural times is also effective. For instance, the oil fractions may experience hydrotreating, the oil fractions may initially experience hydrotreating and subsequently alkali-distilling or sulfate-cleaning, the oil fractions may initially experience hydrotreating and subsequently dewaxing, the oil fractions may initially experience solvent-extracting and subsequently hydrotreating, the oil fractions may experience hydrotreating twice or three times, the oil fractions may initially experience hydrotreating twice or three times and subsequently alkali-distilling or sulfate-cleaning, or the oil fractions may initially experience the above-described treatment(s) and subsequently dewaxing again (i.e., deep dewaxing). Among the above-described methods, the mineral oil provided by deep dewaxing is preferable for the highly-refined mineral oil used as the base oil in the invention because such mineral oil is excellent in low-temperature fluidity and free from wax precipitation at low temperatures. According to the deep dewaxing, the oil fractions are solvent-dewaxed under severe conditions or the oil fractions are catalytic-dewaxed using a zeolite catalyst.

When the polyvinyl ether-base compound(s) is used as the base oil of the refrigerator oil composition according to the invention, its kinematic viscosity at 40 degrees C. is preferably 1 to 400 mm$^2$/s, more preferably 5 to 250 mm$^2$/s.

2. Alkyl Benzene

Examples of the alkyl benzene are any alkyl benzene usable for refrigerator oil, among which alkyl benzene having high viscosity is preferably used for the invention. Although there is a variety of such highly-viscous alkyl benzene, alkyl benzene whose alkyl group has 20 or more carbon atoms in total (or alkyl benzene whose plurality of alkyl groups have 20 or more carbon atoms in sum total) such as monoalkyl benzene, dialkyl benzene or trialkyl benzene is preferable. Alkyl benzene having two or more alkyl groups in which 20 or more carbon atoms are contained in sum total (e.g., dialkyl benzene) is more preferably used in view of thermal stability. As long as kinematic viscosity of the highly-viscous alkyl benzene is within the above-described range, the highly-viscous alkyl benzene may be singularly used or two or more of the above examples may be mixed to be used.

When the polyvinyl ether-base compound(s) is used as the base oil of the refrigerator oil composition according to the invention, its kinematic viscosity at 40 degrees C. is preferably 1 to 400 mm$^2$/s, more preferably 5 to 250 mm$^2$/s.

3. Alkyl Naphthalene

A preferable example of the alkyl naphthalene is alkyl naphthalene whose naphthalene ring is bonded with two or three alkyl groups. Particularly, alkyl naphthalene having 20 or more carbon atoms in total is more preferable in view of thermal stability. In the invention, the alkyl naphthalene may be singularly used or a mixture thereof may be used.

When the polyvinyl ether-base compound(s) is used as the base oil of the refrigerator oil composition according to the invention, its kinematic viscosity at 40 degrees C. is preferably 1 to 400 mm$^2$/s, more preferably 5 to 250 mm$^2$/s.

4 Poly-α-Olefin

Although there is a variety of usable poly-α-olefin, the poly-α-olefin is typically an α-olefin polymer having 8 to 18 carbon atoms. The poly-α-olefin polymer is preferably a 1-dodecene polymer, a 1-decene polymer or a 1-octene polymer in view of thermal stability, sealability, lubricity and the like. In the invention, hydrotreated poly-α-olefin is preferably used as the poly-α-olefin in view of thermal stability. The poly-α-olefin may be singularly used or a mixture thereof or a polymer of α-olefin mixture may be used.

When the polyvinyl ether-base compound(s) is used as the base oil of the refrigerator oil composition according to the invention, its kinematic viscosity at 40 degrees C. is preferably 1 to 400 mm$^2$/s, more preferably 5 to 250 mm$^2$/s.

5 Polyvinyl Ether

Examples of the polyvinyl ether used as the base oil are a compound prepared by polymerizing vinyl ether monomer (hereinafter called as polyvinyl ether I), a compound prepared by copolymerizing vinyl ether monomer and hydrocarbon monomer having olefin double-bond(s) (hereinafter called as polyvinyl ether copolymer II), and a copolymer of polyvinyl ether and alkylene glycol, polyalkylene glycol or monoether thereof (hereinafter called as polyvinyl ether copolymer III).

Examples of vinyl ether monomer used as the material of the polyvinyl ether I are vinyl methyl ether, vinyl ethyl ether, vinyl-n-propyl ether, vinyl isopropyl ether, vinyl-n-butyl ether, vinyl-isobutyl ether, vinyl-sec-butyl ether, vinyl-tert-butyl ether, vinyl-n-pentyl ether, vinyl-n-hexyl ether, vinyl-2-methoxyethyl ether, vinyl-2-ethoxyethyl ether, vinyl-2-methoxy-1-methylethyl ether, vinyl-2-methoxy-propyl ether, vinyl-3,6-dioxaheptyl ether, vinyl-3,6,9-trioxadecyl ether, vinyl-1,4-dimethyl-3,6-dioxaheptyl ether, vinyl-1,4,7-trimethyl-3,6,9-trioxadecyl ether, vinyl-2,6-dioxa-4-heptyl ether, vinyl-2,6,9-trioxa-4-decyl ether, 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, 2-tert-butoxypropene, 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene, 2-tert-butoxy-2-butene and the like. The above vinyl ether-base monomers can be manufactured by a known method.

One of the above vinyl ether monomers may be singularly used or a combination of two or more thereof may be used.

The vinyl ether monomers listed above each may be also used as the material for the polyvinyl ether copolymer II. One of the above vinyl ether monomers may be singularly used or a combination of two or more thereof may be used.

Examples of the hydrocarbon monomer having olefin double-bond(s), which is the other material of the polyvinyl ether copolymer II, are ethylene, propylene, butenes, pentenes, hexenes, heptenes, octenes, diisobutylene, triisobutylene, styrene, α-methylstyrene, alkyl-substituted styrenes and the like.

One of the above hydrocarbon monomers having olefin double-bond(s) may be singularly used or a combination of two or more thereof may be used. The polyvinyl ether copolymer II may be a block copolymer or a random copolymer.

The polyvinyl ether I and the polyvinyl ether copolymer II can be manufactured exemplarily by the following method.

At the initial stage of the polymerization, a compound prepared by combining Bronsted acids, Lewis acids or organometallic compounds with water, alcohols, phenols, acetals or an adduct of vinyl ethers and a carboxylic acid may be used. Examples of the Bronsted acids are hydrofluoric acid, hydrochloric acid, hydrobromic acid, hydroiodic acid, nitric acid, sulfuric acid, trichloroacetic acid, trifluoroacetic acid and the like. Examples of the Lewis acids are boron trifluoride, aluminum trichloride, aluminum tribromide, tin tetrachloride, zinc dichloride, ferric chloride and the like, among which boron trifluoride is particularly preferable. Examples of the organometallic compounds are diethylaluminum chloride, ethylaluminum chloride, diethylzinc and the like.

An initiating terminal of the polymer, from which the polymerization of the polymer is initiated, is a hydrogen atom when water, alcohols or phenols is used. On the other hand, when acetals is used, the initiating terminal is a hydrogen atom or a residue formed by eliminating one of alkoxy groups from the used acetals. In addition, when the adduct of vinyl ethers and carboxylic acid is used, the initiating terminal is a residue formed by eliminating an alkylcarbonyloxy group originated in the carboxylic acid from the adduct of vinyl ethers and carboxylic acid.

On the other hand, an end terminal, at which the polymerization of the polymer is ended, is acetal, olefin or aldehyde when water, alcohols, phenols or acetals is used. When the adduct of vinyl ether and carboxylic acid is used, the end terminal is carboxylic ester of hemiacetal. The terminals of the polymer as described above may be substituted by desirable group(s) by a known method. Examples of the desirable group(s) are a saturated hydrocarbon residue, an ether residue, an alcohol residue, a ketone residue, a nitril residue and an amid residue, among which a saturated hydrocarbon residue, an ether residue and an alcohol residue are preferable.

Although depending on materials and initiators to be used, reaction of the polymerization can be initiated within a temperature range of −80 to 150 degrees C., typically within a temperature range of −80 to 50 degrees C. The reaction of the polymerization is ended in ten seconds to ten hours after the initiation of the reaction. The reaction of the polymerization is usually conducted under the presence of solvent. The solvent is not particularly limited as long as a sufficient amount of the reaction material can be dissolved in the solvent and the solvent is inactive against the reaction. Hydrocarbon-base solvent such as hexane, benzene or toluene and ether-base solvent such as ethyl ether, 1,2-dimethoxyethane or tetrahydrofuran can be preferably used.

On the other hand, the polyvinyl ether copolymer III can be manufactured by using alkylene glycol, polyalkylene glycol or monoether thereof as the initiator and polymerizing the vinyl ether monomer in accordance with the above polymerizing method.

Examples of the alkylene glycol, the polyalkylene glycol or the monoether thereof are alkylene glycol or polyalkylene glycol such as ethylene glycol, diethylene glycol, triethylene glycol, polyethylene glycol, propylene glycol, dipropylene glycol, tripropylene glycol or polypropylene glycol, and alkylene glycol monoether or polyalkylene glycol monoether such as ethylene glycol monomethylether, diethylene glycol monomethylether, triethylene glycol monomethylether, propylene glycol monomethylether, dipropylene glycol monomethylether, or tripropylene glycol monomethylether.

The vinyl ether monomers listed in the description of the polyvinyl ether I may be used as the materials for the polyvinyl ether copolymer III. One of the above vinyl ether monomers may be singularly used or a combination of two or more thereof may be used.

In the invention, one of the above polyvinyl ether may be singularly used or a combination of two or more thereof may be used.

When the polyvinyl ether-base compound(s) is used as the base oil of the refrigerator oil composition according to the invention, its kinematic viscosity at 40 degrees C. is preferably 1 to 400 mm$^2$/s, more preferably 5 to 250 mm$^2$/s.

6 Polyalkylene Glycol (PAG)

An example of the polyalkylene glycol used in the base oil of the refrigerator oil composition according to the invention is a compound represented by the following formula (3).

$$R^9\text{—}[(OR^{10})_{m1}\text{—}OR^{11}]_{n1} \quad (3)$$

In the formula, $R^9$ represents a hydrogen atom, an alkyl group having 1 to 10 carbon atoms, an acyl group having 2 to 10 carbon atoms or an aliphatic hydrocarbon group having 2 to 6 bonding sites and 1 to 10 carbon atoms, $R^{10}$ represents an alkylene group having 2 to 4 carbon atoms, $R^{11}$ represents a hydrogen atom, an alkyl group having 1 to 10 carbon atoms or an acyl group having 2 to 10 carbon atoms, n1 represents an integer in a range of 1 to 6, and m1 represents a number that is determined such that the average value of m1 multiplied by n1 is in a range of 6 to 80.

In the formula (3), the alkyl groups represented by $R^9$ and $R^{11}$ each may be linear, branched or cyclic. Examples of the alkyl groups are a methyl group, an ethyl group, an n-propyl group, an isopropyl group, butyl groups, pentyl groups, hexyl groups, heptyl groups, octyl groups, nonyl groups, decyl groups, a cyclopentyl group, a cyclohexyl group and the like. When the number of the carbon atoms contained in the alkyl group(s) exceeds 10, compatibility of the base oil with the refrigerant is deteriorated, so that a phase separation may occur. The alkyl group(s) preferably has 1 to 6 carbon atoms.

In addition, alkyl groups of the acyl groups represented by $R^9$ and $R^{11}$ each may be linear, branched or cyclic. Examples of the alkyl groups of the acyl groups are the same groups as listed in the above description of the alkyl groups. The examples of the alkyl groups of the acyl groups each have 1 to 9 carbon atoms. When the number of the carbon atoms contained in the acyl group(s) exceeds 10, compatibility of the base oil with the refrigerant is deteriorated, so that a phase separation may occur. The acyl group(s) preferably has 2 to 6 carbon atoms.

When $R^9$ and $R^{11}$ each represent an alkyl group or an acyl group, $R^9$ and $R^{11}$ may be mutually the same or different.

In addition, when n1 is 2 or more, plural $R^9$ included in one molecule may be the same or mutually different.

When $R^9$ is an aliphatic hydrocarbon group having 2 to 6 bonding sites and 1 to 10 carbon atoms, the aliphatic hydrocarbon group may be linear or cyclic. Examples of the aliphatic hydrocarbon group having 2 bonding sites are an ethylene group, a propylene group, a butylene group, a pentylene group, a hexylene group, a heptylene group, an octylene group, a nonylene group, a decylene group, a cyclopentylene group, a cyclohexylene group and the like. An example of an aliphatic hydrocarbon group having 3 to 6 bonding sites is a residue formed by eliminating a hydroxyl group from multivalent alcohol such as trimethylolpropane, glycerin, pentaerythritol, sorbitol, 1,2,3-trihydroxycyclohexane, or 1,3,5-trihydroxycyclohexane.

When the number of the carbon atoms contained in the aliphatic hydrocarbon group exceeds 10, compatibility of the base oil with the refrigerant is deteriorated, so that a phase separation may occur. The aliphatic hydrocarbon group preferably has 2 to 6 carbon atoms.

In the formula (3), $R^{10}$ represents an alkylene group having 2 to 4 carbon atoms. Examples of an oxyalkylene group, which is a repeating unit of the alkylene group, are an oxyethylene group, an oxypropylene group and an oxybutylene group. Although a plurality of oxyalkylene groups included in one molecule may be mutually the same or different, at least one oxypropylene group is preferably included in one molecule. More preferably, an oxypropylene unit is contained in an oxyalkylene unit with a content of 50 mol % or more.

In the formula (3), n1, which represents an integer in a range of 1 to 6, is determined in accordance with the number of the bonding sites of $R^9$. For instance, n1 is 1 when $R^9$ is an alkyl group or an acyl group while n1 is 2, 3, 4, 5 or 6 when $R^9$ is an aliphatic hydrocarbon group having 2, 3, 4, 5 or 6 bonding sites respectively. In addition, m1 is determined so that the average value of m1 multiplied by n1 is in a range of 6 to 80. When the average value of m1 multiplied by n1 is not in the above range, an object of the invention will not be sufficiently achieved.

The polyalkylene glycol represented by the formula (3) contains polyalkylene glycol having hydroxyl groups at its terminals. As long as the content of the hydroxyl groups is 50 mol % or less of the total terminal groups, the polyalkylene glycol containing the hydroxyl groups can be preferably used. When the content of the hydroxyl groups is more than 50 mol %, hygroscopicity is unfavorably increased, such that viscosity index is decreased.

Polyalkylene glycols such as polypropylene glycol dimethylether, polyoxyethylene, polypropylene glycol dimethylether, polypropylene glycol monobutylether or polypropylene glycol diacetate are preferable in view of cost and effects. Incidentally, in a copolymer that includes a polyoxypropylene (PO) unit and a polyoxyethylene (EU) unit such as polyoxypropylene polyoxyethylene copolymer dimethyl ether, a molar ratio of PO/EO may belong to a range from 99:1 to 10:90, and the copolymer may be a random copolymer or a block copolymer.

The polyalkylene glycol represented by the formula (3) may be any one of the compounds described in detail in JP-A-02-305893.

In the invention, one of the polyalkylene glycol may be singularly used or a combination of two or more thereof may be used.

When the compound(s) is used as the base oil of the refrigerator oil composition according to the invention, its kinematic viscosity at 40 degrees C. is preferably 1 to 400 mm²/s, more preferably 5 to 250 mm²/s.

(7) Polycarbonate-Base Compound

A polycarbonate-base compound used in the base oil of the refrigerator oil composition according to the invention is preferably polycarbonate having two or more carbonate bonds in one molecule, i.e., at least one compound selected from a group consisting of a compound represented by the following formula (4) and a compound represented by the following formula (5).

[Chemical Formula 2]

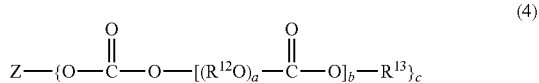

(4)

In the formula: Z represents a residue formed by eliminating a hydroxyl group from c-valent alcohol having 1 to 12 carbon atoms; $R^{12}$ represents a linear or branched alkylene group having 2 to 10 carbon atoms; $R^{13}$ represents a monovalent hydrocarbon group having 1 to 12 carbon atoms or a group containing an ether bond represented by $R^{15}(O-R^{14})d$-, where $R^{15}$ represents a hydrogen atom or a monovalent hydrocarbon group having 1 to 12 carbon atoms, $R^{14}$ represents a linear or branched alkylene group having 2 to 10 carbon atoms, and d represents an integer in a range of 1 to 20; a represents an integer in a range of 1 to 30; b represents an integer in a range of 1 to 50; and c represents an integer in a range of 1 to 6.

[Chemical Formula 3]

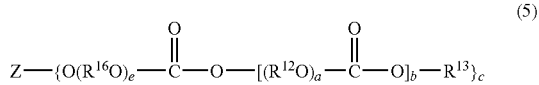

(5)

In the formula, $R^{16}$ represents a linear or branched alkylene group having 2 to 10 carbon atoms; e represents an integer in a range of 1 to 20; and Z, $R^{12}$, $R^{13}$, a, b and c each represent the same as in the above.

In the formulae (4) and (5), Z represents a residue formed by eliminating a hydroxyl group from 1 to 6-valent alcohol having 1 to 12 carbon atoms. More preferably, Z represents a residue formed by eliminating a hydroxyl group from monovalent alcohol having 1 to 12 carbon atoms.

Examples of 1 to 6-valent alcohol having 1 to 12 carbon atoms, whose residue corresponds to Z, are: monovalent alcohol such as aliphatic monovalent alcohol exemplified by methyl alcohol, ethyl alcohol, n- or isopropyl alcohol, butyl alcohols, pentyl alcohols, hexyl alcohols, octyl alcohols, decyl alcohols and dodecyl alcohols, alicyclic monovalent alcohol exemplified by cyclopentyl alcohol and cyclohexyl alcohol, aromatic alcohol exemplified by phenol, cresol, xylenol, butylphenol and naphthol, or aromatic aliphatic alcohol exemplified by benzyl alcohol and phenethyl alcohol; divalent alcohol such as aliphatic alcohol exemplified by ethylene glycol, propylene glycol, butylene glycol, neo-pentylene glycol and tetramethylene glycol, alicyclic alcohol exemplified by cyclohexanediol and cyclohexanedimethanol, or aromatic alcohol exemplified by catechol, resorcinol, hydroquinone and dihydroxydiphenyl; trivalent alcohol such as aliphatic alcohol exemplified by glycerin, trimethylolpropane, trimethylolethane, trimethylolbutane and 1,3,5-pentanetriol, alicyclic alcohol exemplified by cyclohexanetriol and cyclohexanetrimethanol, or aromatic alcohol exemplified by pyrogallol and methylpyrogallol; and 4 to 6-valent alcohol such as aliphatic alcohol exemplified by pentaerythritol, diglycerin, triglycerin, sorbitol and dipentaerythritol.

An example of the polycarbonate compound represented by the formula (4) is a compound represented by the formula (4-a), and/or an example of the polycarbonate compound represented by the formula (5) is a compound represented by the formula (5-a).

[Chemical Formula 4]

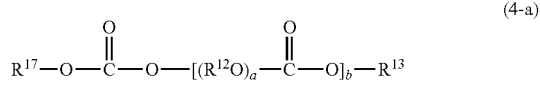

(4-a)

In the formula, $R^{17}$ represents a residue formed by eliminating a hydroxyl group from monovalent alcohol having 1 to 12 carbon atoms, and $R^{12}$, $R^{13}$, a and b each represent the same as above.

[Chemical Formula 5]

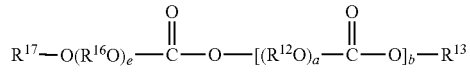

In the formula, $R^{12}$, $R^{13}$, $R^{16}$, $R^{17}$, a, b and e each represent the same as above.

In the formulae (4-a) and (5-a), examples of the residue represented by $R^{17}$ (the residue formed by eliminating a hydroxyl group from monovalent alcohol having 1 to 12 carbon atoms) are an aliphatic hydrocarbon group such as a methyl group, an ethyl group, an n-propyl group, an isopropyl group, butyl groups, pentyl groups, hexyl groups, octyl groups, decyl groups or dodecyl groups, an alicyclic hydrocarbon group such as a cyclopentyl group, a cyclohexyl group, a methylcyclohexyl group, a dimethylcyclohexyl group or a decahydronaphthyl group, an aromatic hydrocarbon group such as a phenyl group, tolyl groups, xylyl groups, a mesityl group or naphthyl groups, and aromatic aliphatic hydrocarbon group such as a benzyl group, a methyl benzyl group, a phenethyl group or naphthylmethyl groups. Among the above, a linear or branched alkyl group having 1 to 6 carbon atoms is preferable.

$R^{12}$ represents a linear or branched alkylene group having 2 to 10 carbon atoms. The alkylene group preferably has 2 to 6 carbon atoms. In addition, an ethylene group and a propylene group are particularly preferable in view of performance and manufacturing simplicity. $R^{13}$ represents a monovalent hydrocarbon group having 1 to 12 carbon atoms or a group containing an ether bond represented by $R^{15}(O-R^{14})d$-, where $R^{15}$ represents a hydrogen atom or a monovalent hydrocarbon group having 1 to 12 carbon atoms (preferably 1 to 6 carbon atoms), $R^{14}$ represents a linear or branched alkylene group having 2 to 10 carbon atoms, and d represents an integer in a range of 1 to 20. Examples of the monovalent hydrocarbon group having 1 to 12 carbon atoms are the same as those listed in the description of $R^{17}$. The linear or branched alkylene group having 2 to 10 carbon atoms represented by $R^{14}$ preferably has 2 to 6 carbon atoms for the same reason as described in relation to $R^{12}$. In addition, an ethylene group and a propylene group are particularly preferable.

$R^{13}$ preferably represents a linear or branched alkyl group having 1 to 6 carbon atoms.

Although a variety of methods of manufacturing is available for the above polycarbonate-base compound, a target polycarbonate-base compound can be typically manufactured by reacting a carbonate ester-forming derivative (e.g., carbonate diester, phosgene or the like) with alkylene glycol or polyoxyalkylene glycol in accordance with a known method.

In the invention, one of the polycarbonate-base compounds may be singularly used or a combination of two or more thereof may be used.

When the polycarbonate-base compound(s) is used as the base oil of the refrigerator oil composition according to the invention, its kinematic viscosity at 40 degrees C. is preferably 1 to 400 mm²/s, more preferably 5 to 250 mm²/s.

(8) Polyol Ester-Base Compound

An example of an polyol ester-base compound used in the base oil of the refrigerator oil composition according to the invention is ester of polyol having approximately 3 to 20 diols or hydroxyl groups and aliphatic acid having approximately 1 to 24 carbon atoms. Examples of the diol are ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, 1,12-dodecanediol and the like. Examples of the polyol are multivalent alcohol such as trimethylolethane, trimethylolpropane, trimethylolbutane, di-(trimethylolpropane), tri-(tromethylolpropane), pentaerythritol, di-(pentaerythritol), tri-(pentaerythritol), glycerin, polyglycesin (2 to 20-meric glycerin), 1,3,5-pentanetriol, sorbitol, sorbitan, sorbitol-glycerin condensation, adonitol, arabitol, xylitol or mannitol, sugars such as xylose, arabinose, ribose, rhamnose, glucose, fructose, galactose, mannose, sorbose, cellobiose, maltose, isomaltose, trehalose, sucrose, raffinose, gentianose or melezitose, partially-etherified compounds of the above, methyl glucoside (glycoside) and the like. Among the above, the polyol is preferably hindered alcohol such as neopentyl glycol, trimethylol ethane, trimethylol propane, trimethylol butane, di-(trimethylol propane), tri-(trimethylol propane), pentaerythritol, di-(pentaerythritol) or tri-(pentaerythritol).

Although the number of the carbon atoms contained in the aliphatic acid(s) is not subject to any specific limitations, aliphatic acid(s) having 1 to 24 carbon atoms is typically used. Among the aliphatic acids having 1 to 24 carbon atoms, an aliphatic acid having 3 or more carbon atoms is preferable in view of lubricity, an aliphatic acid having 4 or more carbon atoms is more preferable, an aliphatic acid having 5 or more carbon atoms is further more preferable, and an aliphatic acid having 10 or more carbon atoms is the most preferable. In addition, in view of compatibility of the base oil with the refrigerant, an aliphatic acid having 18 or less carbon atoms is preferable, an aliphatic acid having 12 or less carbon atoms is more preferable, and an aliphatic acid having 9 or less carbon atoms is further more preferable.

The aliphatic acid may be linear or branched. The aliphatic acid is preferably linear in view of lubricity while the aliphatic acid is preferably branched in view of hydrolytic stability. Further, the aliphatic acid may be saturated or unsaturated.

Examples of the aliphatic acid are linear or branched acids such as a pentane acid, a hexane acid, a heptane acid, an octane acid, a nonane acid, a decane acid, an undecane acid, a dodecane acid, a tridecane acid, a tetradecane acid, a pentadecane acid, a hexadecane acid, a heptadecane acid, an octadecane acid, nonadecane acid, an icosane acid and an oleic acid, and a so-called neo-acid having quaternary a carbon atom. Specific examples of the above are a valeric acid (n-pentane acid), a caproic acid (n-hexane acid), an enanthic acid (n-heptane acid), a caprylic acid (n-octane acid), a pelargonic acid (n-nonane acid), a capric acid (n-decane acid), an oleic acid (cis-9-octadecene acid), an isopentane acid (3-methylbutane acid), a 2-methylhexane acid, a 2-ethylpentane acid, a 2-ethylhexane acid, a 3,5,5-trimethylhexane acid and the like.

The polyol ester may be a partial ester in which some hydroxyl groups of polyol remain unesterified, a full ester in which all the hydroxyl groups are esterified or a mixture of a partial ester and a full ester. The polyol ester is preferably a full ester.

Among the above polyol esters, ester of hindered alcohol such as neopentyl glycol, trimethylol ethane, trimethylol propane, trimethylol butane, di-(trimethylol propane), tri-(trimethylol propane), pentaerythritol, di-(pentaerythritol) and tri-(pentaerythritol) is preferable in view of hydrolytic stability. The polyol ester is more preferably ester of neopentyl glycol, trimethylol ethane, trimethylol propane, trimethylol butane or pentaerythritol. The polyol ester is the most preferably ester of pentaerythritol because ester of pentaerythritol is particularly excellent in the compatibility with the refrigerant and hydrolytic stability.

Preferable examples of the polyol ester-base compound are diester of neopentyl glycol and one or more aliphatic acid(s) selected from a group consisting of a valeric acid, a caproic acid, an enanthic acid, a caprylic acid, a pelargonic acid, a capric acid, an oleic acid, an isopentane acid, a 2-methylhexane acid, a 2-ethylpentane acid, a 2-ethylhexane acid and a 3,5,5-trimethylhexane acid, triester of trimethylol ethane and one or more aliphatic acid(s) selected from a group consisting of a valeric acid, a caproic acid, an enanthic acid, a caprylic acid, a pelargonic acid, a capric acid, an oleic acid, an isopentane acid, a 2-methylhexane acid, a 2-ethylpentane acid, a 2-ethylhexane acid and a 3,5,5-trimethylhexane acid, triester of trimethylol propane and one or more aliphatic acid(s) selected from a group consisting of a valeric acid, a caproic acid, an enanthic acid, a caprylic acid, a pelargonic acid, a capric acid, an oleic acid, an isopentane acid, a 2-methylhexane acid, a 2-ethylpentane acid, a 2-ethylhexane acid and a 3,5,5-trimethylhexane acid, triester of trymethylol butane and one or more aliphatic acid(s) selected from a group consisting of a valeric acid, a caproic acid, an enanthic acid, a caprylic acid, a pelargonic acid, a capric acid, an oleic acid, an isopentane acid, a 2-methylhexane acid, a 2-ethylpentane acid, a 2-ethylhexane acid and a 3,5,5-trimethylhexane acid, and tetraester of pentaerythritol and one or more aliphatic acid(s) selected from a group consisting of a valeric acid, a caproic acid, an enanthic acid, a caprylic acid, a pelargonic acid, a capric acid, an oleic acid, an isopentane acid, a 2-methylhexane acid, a 2-ethylpentane acid, a 2-ethylhexane acid and a 3,5,5-trimethylhexane acid.

In the invention, one of the polyol ester-base compounds may be singularly used or a combination of two or more thereof may be used.

When the polyol ester-base compound(s) is used as the base oil of the refrigerator oil composition according to the invention, its kinematic viscosity at 40 degrees C. is preferably 1 to 400 mm²/s, more preferably 5 to 250 mm²/s.

(9) Ether-Base Compound

In the refrigerator oil composition according to the invention, an ether-based compound having a structure represented by the following formula (1) is preferably used in the base oil.

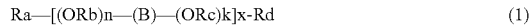

In the formula (1): Ra and Rd each represent a hydrogen atom, an alkyl group having 1 to 10 carbon atoms, an acyl group having 2 to 10 carbon atoms or a hydrocarbon group having 2 to 6 bonding sites and 1 to 10 carbon atoms; Rb and Rc each represent an alkylene group having 2 to 4 carbon atoms; n and k each represent an integer in a range of 0 to 20; x represents an integer in a range of 1 to 6. (B) represents a polymerization site containing 3 or more monomer units each represented by a formula (2) as follows,

[Chemical Formula 6]

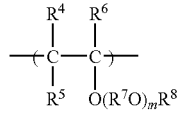

(2)

In the formula (2), $R^4$, $R^5$ and $R^6$ each represent a hydrogen atom or a hydrocarbon group having 1 to 8 carbon atoms. $R^4$, $R^5$ and $R^6$ may be mutually the same or different.

The hydrocarbon group specifically means an alkyl group of a methyl group, an ethyl group, an n-propyl group, an isopropyl group, an n-butyl group, an isobutyl group, a sec-butyl group, a tert-butyl group, pentyl groups, hexyl groups, heptyl groups or octyl groups, a cycloalkyl group of a cyclopentyl group, a cyclohexyl group, methylcyclohexyl groups, ethylcyclohexyl groups, dimethylcyclohexyl groups or the like, an aryl group of a phenyl group, methylphenyl groups, ethylphenyl groups or dimethylphenyl groups, or an arylalkyl group of a benzyl group, phenylethyl groups or methylbenzyl groups. $R^4$, $R^5$ and $R^6$ each preferably represent a hydrogen atom in view of stability of synthesizing reaction.

On the other hand, $R^7$ represents a divalent hydrocarbon group having 1 to 10 carbon atoms or an ether-bonded oxygen-containing divalent hydrocarbon group having 2 to 20 carbon atoms. Examples of the divalent hydrocarbon group having 1 to 10 carbon atoms are: a divalent aliphatic group such as a methylene group, an ethylene group, a phenylethylene group, a 1,2-propylene group, a 2-phenyl-1,2-propylene group, a 1,3-propylene group, butylene groups, pentylene groups, hexylene groups, heptylene groups, octylene groups, nonylene groups or decylene groups; an alicyclic group having two bonding sites at an alicyclic hydrocarbon such as cyclohexane, methylcyclohexane, ethylcyclohexane, dimethylcyclohexane or propylcyclohexan; a divalent aromatic hydrocarbon group such as phenylene groups, methylphenylene groups, ethylphenylene groups, dimethylphenylene groups or naphthylene groups; an alkyl aromatic group having a monovalent bonding site respectively in an alkyl group portion and an aromatic group portion of alkyl aromatic hydrocarbon such as toluene, xylene, or ethylbenzene; and an alkyl aromatic group having a bonding site in an alkyl group portion of polyalkyl aromatic hydrocarbon such as xylene or diethylbenzene. Among the above, the aliphatic group having 2 to 4 carbon atoms is particularly preferable in view of the compatibility of the base oil with the refrigerant.

Preferable examples of the ether-bonded oxygen-containing divalent hydrocarbon group having 2 to 20 carbon atoms are a methoxymethylene group, a methoxyethylene group, a methoxymethylethylene group, a 1,1-bis-methoxymethylethylene group, a 1,2-bis-methoxymethylethylene group, an ethoxymethylethylene group, a (2-methoxyethoxy)methylethylene group, a (1-methyl-2-methoxy)methylethylene group and the like. In the formula (2), m represents the number of units $R^7O$, an average value of which is 0 to 10, preferably 0 to 5. When plural m are present, the plural m may be mutually the same or different per unit. When plural units of $R^7O$ are contained, the plural units of $R^7O$ may be mutually the same or different. When both k and n are 0, m is an integer of 1 or more in the formula (2).

$R^8$ represents a hydrogen atom or a hydrocarbon group having 1 to 20 carbon atoms. The hydrocarbon group specifically means an alkyl group of a methyl group, an ethyl group, an n-propyl group, an isopropyl group, an n-butyl group, an isobutyl group, a sec-butyl group, a tert-butyl group, pentyl groups, hexyl groups, heptyl groups, octyl groups, nonyl groups, decyl groups or the like, a cycloalkyl group of a cyclopentyl group, a cyclohexyl group, methylcyclohexyl groups, ethylcyclohexyl groups, propylcyclohexyl groups, dimethylcyclohexyl groups or the like, an aryl group of a phenyl group, methylphenyl groups, ethylphenyl groups, dimethylphenyl groups, propylphenyl groups, trimethylphenyl groups, butylphenyl groups, naphthyl groups or the like, or an arylalkyl group of a benzyl group, phenylethyl groups, methylbenzyl groups, phenylpropyl groups, phenylbutyl groups or the like. Plural $R^4$ to $R^8$ of the plural units may be mutually the same or different per unit.

By copolymerizing the ether-base compound having the monomer unit represented by the formula (2), lubricity, insulation properties, hygroscopicity and the like can be enhanced while a sufficient level of the compatibility with the refrigerant is retained. At this time, by suitably selecting a type of the monomer used as the material, a type of the initiator and a copolymer ratio, the level of the above performance of the refrigerator oil composition can be set at a target level. Accordingly, it is possible to obtain an oil composition that can exhibit required levels of lubricity and compatibility that vary depending on: types of compressors used in freezing or air-conditioning systems to which lubricating oil is applied; materials and freezing capabilities of lubricating portions; and types of refrigerants.

In the ether-base compound represented by the formula (1), (B) represents a polymerization site containing three or more monomer units each represented by the formula (2). The number of the monomer units (i.e., polymerization degree) can be suitably determined in accordance with a desired level of kinematic viscosity. The polymerization degree is typically determined so that the kinematic viscosity at 100 degrees C. becomes preferably 1 to 50 mm²/s, more preferably 2 to 50 mm²/s, further more preferably 5 to 50 mm²/s, particularly preferably 5 to 20 mm²/s.

Preferably in the ether-base compound represented by the formula (1), its molar ratio of carbon to oxygen (molar ratio of carbon/oxygen) is 4 or less. When the molar ratio is more than 4, the compatibility of the compound with a natural refrigerant such as carbon dioxide is deteriorated.

Instead of representing a homopolymer site containing the monomer units each represented by the formula (2), (B) in the formula (1) may represent a block copolymer site or a random copolymer site containing the monomer unit(s) represented by the formula (2) and monomer unit(s) represented by the following formula (6).

[Chemical Formula 7]

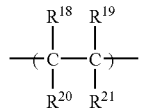

(6)

In the formula (6), $R^{18}$ to $R^{21}$ each represent a hydrogen atom or a hydrocarbon group having 1 to 20 carbon atoms. $R^{18}$ to $R^{21}$ may be mutually the same or different. Examples of the hydrocarbon group having 1 to 20 carbon atoms are the same as those of $R^8$ in the formula (2). In addition, $R^{18}$ to $R^{21}$ of plural monomer units may be mutually the same or different per monomer unit.

Polymerization degree of the ether-base compound represented by the formula (1), which contains a block or random copolymer containing the monomer unit represented by the formula (2) and the monomer unit represented by the formula (6), may be suitably determined in accordance with a desired level of kinematic viscosity. The polymerization degree is typically determined such that the kinematic viscosity at 100 degrees C. preferably becomes 5 mm$^2$/s or more, more preferably 5 to 20 mm$^2$/s. Preferably in the ether-base compound, its molar ratio of carbon/oxygen is 4 or less. When the molar ratio is more than 4, the compatibility of the compound with a natural refrigerant such as carbon dioxide is deteriorated.

The above ether-base compound can be manufactured by polymerizing the relevant vinyl ether-base monomer or by copolymerizing the relevant hydrocarbon monomer having olefin double-bond(s) and the relevant vinyl ether-base monomer.

In view of stability of synthesizing reaction, the ether-base compound is preferably structured such that, in the formula (1), Ra represents a hydrogen atom and n equals to 0 at the first terminal of the compound while Rd represents a hydrogen atom and k equals to 0 at the second terminal of the compound.

Such an ether-base compound can be manufactured by performing such polymerization on a monomer as radical polymerization, cation polymerization or radiation polymerization. For instance, by polymerizing a vinyl ether-base monomer in accordance with the following method, the obtained polymer of the vinyl ether-base monomer can exhibit a desired level of viscosity. At the initial stage of the polymerization, a compound prepared by combining Bronsted acids, Lewis acids or organometallic compounds with water, alcohols, phenols, acetals or an adduct of vinyl ethers and a carboxylic acid may be used. Examples of the Bronsted acids are hydrofluoric acid, hydrochloric acid, hydrobromic acid, hydroiodic acid, nitric acid, sulfuric acid, trichloroacetic acid, trifluoroacetic acid and the like. Examples of the Lewis acids are boron trifluoride, aluminum trichloride, aluminum tribromide, tin tetrachloride, zinc dichloride, ferric chloride and the like, among which boron trifluoride is particularly preferable. Examples of the organometallic compounds are diethylaluminum chloride, ethylaluminum chloride, diethylzinc and the like.

Water, alcohols, phenols, acetals or an adduct of vinyl ethers and a carboxylic acid that is to be combined with the above may be suitably determined. Examples of the alcohols are saturated aliphatic alcohol having 1 to 20 carbon atoms such as methanol, ethanol, propanol, isopropanol, butanol, isobutanol, sec-butanol, tert-butanol, pentanols, hexanols, heptanols or octanols, unsaturated aliphatic alcohol having 3 to 10 carbon atoms such as aryl alcohol, monoether of alkylene glycol such as ethylene glycol monomethyl ether, diethylene glycol monomethyl ether, triethylene glycol monomethyl ether, propylene glycol monomethyl ether, dipropylene glycol monomethyl ether or tripropylene glycol monomethyl ether, and the like. Examples of the carboxylic acid used for preparing the adduct of vinyl ethers and the carboxylic acid are acetic acid, propionic acid, n-butyric acid, iso-butyric acid, n-valeric acid, iso-valeric acid, 2-methyl butyric acid, pivalic acid, n-caproic acid, 2,2-dimethyl butyric acid, 2-methyl valeric acid, 3-methyl valeric acid, 4-methyl valeric acid, enanthic acid, 2-methyl caproic acid, caprylic acid, 2-ethyl caproic acid, 2-n-propyl valeric acid, n-nonane acid, 3,5,5-trimethyl caproic acid, caprylic acid, undecane acid and the like.

According to the invention, the mineral oil or the synthetic oil employed as the base oil may be singularly used or a mixture thereof may be used. In either case, the kinematic viscosity at 100 degrees C. may be determined preferably at 1 to 50 mm$^2$/s, more preferably at 3 to 50 mm$^2$/s, further more preferably at 5 to 30 mm$^2$, particularly preferably at 5 to 20 mm$^2$/s.

A molecular weight of the base oil is preferably in a range of 150 to 5,000 in view of evaporation prevention, the flash point, performance as the refrigerator oil and the like, more preferably in a range of 300 to 3,000. A viscosity index of 60 or more is preferable.

A lubricating oil composition for refrigerator according to the invention is formed by adding to a base oil an organic compound whose molecules include double bond. It is preferable that this double bond does not accompany an aromatic ring structure in the invention.

Here, the organic compound containing a double bond in its molecule functions as an oxygen scavenger. In other words, the organic compound removes oxygen that is present in the refrigerator system in a very small amount by making the oxygen react with the double bond of the organic compound.

Preferable examples of such an oxygen scavenger include an unsaturated aliphatic compound and a terpene containing a double bond.

An employable unsaturated aliphatic compound includes unsaturated hydrocarbon. Examples of the unsaturated hydrocarbon include olefin and polyene such as diene or triene. The olefin preferably is α-olefin, which is more reactive with oxygen than internal olefin is. The α-olefin may be, for example, 1-tetradecene, 1-hexadecene, or 1-octadecene.

In view of reactivity with oxygen, it is preferable that the unsaturated aliphatic compound is, for example, an unsaturated aliphatic alcohol containing conjugated double bond such as vitamin A ((2E, 4E, 6E, 8E)-3,7-dimethyl-9-(2,6,6-trimethylcyclohexe-1-yl) nona-2,4,6,8-tetraene-1-ol) represented by a molecular formula $C_{20}H_{30}O$.

The terpene preferably is terpene hydrocarbon containing a double bond. In view of reactivity with oxygen, terpene hydrocarbon containing a conjugated double bond such as α-farnesene ($C_{15}H_{24}$: 3,7,11-trimethyldodeca-1,3,6,10-tetraene) or α-farnesene ($C_{15}H_{24}$: 7,11-dimethyl-3-methylidenedodeca-1,6,10-triene) is preferable, for example.

The organic compound having double bond in its molecule is preferably contained in the composition with a content of 0.1 to 10 mass % of the total amount of the composition, more preferably 0.5 to 8 mass %, further more preferably 3 to 6 mass %. Satisfactory oxygen-scavenging performance cannot be obtained with an oxygen scavenger contained in less than 0.1 mass % of the organic compound even if the oxygen scavenger has double bond in its molecule. In cases the contained oxygen scavenger is increased to more than 10 mass %, the compatibility with the refrigerant is deteriorated, which may cause a two-layer separation.

Incidentally, although an aromatic ring such as a benzene ring also includes double bond, a compound having an aromatic ring is not suitable for an oxygen scavenger since such a compound is insufficiently reactive with oxygen due to stability of the compound. However, a compound including an aliphatic double bond as well as an aromatic ring can be utilized. For example, a styrene derivative or the like can be utilized as an oxygen scavenger of the invention. Here, the aliphatic double bond may or may not be in conjugated relationship with the aromatic ring.

Refrigerants to which the refrigerator oil composition according to the invention is applied include saturated fluorohydrocarbon (HFC), carbon dioxide ($CO_2$), low-boiling hydrocarbon (HC), and ammonia. Furthermore, a refrigerant containing at least one type of fluorine-containing organic compound selected from compounds represented by the following molecular formula (A) or a combination of such a fluorine-containing compound and a saturated fluorohydrocarbon compound is preferred on account of the low global warming potential.

$$C_pO_qF_rR_s \quad\quad (A)$$

In the formula: R represents a Cl, Br, I or hydrogen atom, p is an integer in a range of 1 to 6, q is an integer in a range of 0 to 2, r is an integer in a range of 1 to 14, and s is an integer in a range of 0 to 13; and if q is 0, p is in a range of 2 to 6, and the molecule includes at least one carbon-carbon unsaturated bond.

The refrigerant represented by the above molecular formula (A) will be described in detail below.

Molecular Formula

The molecular formula (A), which shows the types and numbers of the elements in the molecule, represents a fluorine-containing organic compound in which the number p of carbon atoms C ranges from 1 to 6. Any fluorine-containing organic compound having 1 to 6 carbon atoms possesses physical and chemical properties such as a boiling point, a freezing point and an evaporative latent heat required for a refrigerant.

In the molecular formula (A), the bond state of a quantity p of carbon atoms represented by $C_p$ includes: unsaturated bond such as carbon-carbon single bond and carbon-carbon double bond; and carbon-oxygen double bond. The carbon-carbon unsaturated bond is preferable in view of stability, and the number of the unsaturated bond, which is typically one or more, is preferably one.

In the formula (A), the bond state of a quantity q of oxygen atoms represented by $O_q$ preferably is oxygen from an ether group, a hydroxyl group, or a carbonyl group. The number of oxygen atoms q may be two, which includes cases in which two ether groups, hydroxyl groups or the like are provided.

If q in $O_q$ is zero, which means that the molecule does not include oxygen atoms, p falls in a range of two to six, which means that the molecule includes one or more unsaturated bonds such as carbon-carbon double bonds. In other words, at least one of the bonds of a quantity p of carbon atoms represented by $C_p$ needs to be a carbon-carbon unsaturated bond.

Besides, in the formula (A), R represents Cl, Br, I, or H, any of which may be selected. However, R preferably is H on account of less possibility of destroying the ozone layer.

As set forth above, examples of the fluorine-containing organic compound represented by the formula (A) include an unsaturated fluorohydrocarbon compound, a fluoroether compound, a fluoroalcohol compound, and a fluoroketone compound.

These compounds will be described below.

Unsaturated Fluorohydrocarbon Compound

According to the invention, an example of an unsaturated fluorohydrocarbon compound used as a freezer refrigerant is an unsaturated fluorohydrocarbon compound represented by the molecular formula (A) in which R is H, p is in a range of 2 to 6, q is 0, r is in a range of 1 to 12, and s is in a range of 0 to 11.

Preferred examples of such an unsaturated fluorohydrocarbon compound include fluorinated compounds of a linear or branched chain olefin having 2 to 8 carbon atoms and a ring olefin having 4 to 6 carbon atoms.

The specific examples include ethylene to which 1 to 3 fluorine atoms are introduced, propene to which 1 to 5 fluorine atoms are introduced, butenes to which 1 to 7 fluorine atoms are introduced, pentenes to which 1 to 9 fluorine atoms are introduced, hexenes to which 1 to 11 fluorine atoms are introduced, cyclobutene to which 1 to 5 fluorine atoms are introduced, cyclopentene to which 1 to 7 fluorine atoms are introduced, and cyclohexene to which 1 to 9 fluorine atoms are introduced.

Among the above unsaturated fluorohydrocarbon compounds, an unsaturated fluorohydrocarbon compound having 2 or 3 carbon atoms is preferred, and in particular, a fluorinated compound of propene is further preferred. Specifically, in view of the global warming potential, the compound represented by the molecular formula (A) preferably is a compound represented by one of the molecular formulae $C_3HF_5$, $C_3H_2F_4$, and $C_3H_3F_3$. Examples of the fluorinated compound of propene includes: a variety of isomers of pentafluoropropene; 3,3,3-trifluoropropene; and 2,3,3,3-tetrafluoropropene. Specifically, in view of low global warming potential, 1,2,3,3,3-pentafluoropropene (HFC1225ye) and 2,3,3,3-tetrafluoropropene (HFC1234yf) are preferred.

In the invention, one of the unsaturated fluorohydrocarbon compounds may be singularly used or a combination of two or more thereof may be used.

Besides, a combination of a saturated fluorohydrocarbon refrigerant having 1 or 2 carbon atoms and an unsaturated fluorohydrocarbon refrigerant having 3 carbon atoms is also suitable. Examples of such a combination includes a combination of the above mentioned HFC1225ye and $CH_2F_2$ (HFC32), a combination of HFC1225ye and $CHF_2CH_3$ (HFC152a), and a combination of the above mentioned HFC1234yf and $CF_3I$.

Fluoroether Compound

According to the invention, an example of a fluoroether compound used as a freezer refrigerant is an unsaturated fluoroether compound represented by the molecular formula (A) in which R is H, p is in a range of 2 to 6, q is 1 or 2, r is in a range of 1 to 14, and s is in a range of 0 to 13.

Preferable examples of such a fluoroether compound include: a fluorinated compound of chain aliphatic ether having 2 to 6 carbon atoms and 1 or 2 ether bonds in which the alkyl base is linear or branched; and a fluorinated compound of ring aliphatic ether having 3 to 6 carbon atoms and 1 or 2 ether bond.

The specific examples include dimethyl ether to which 1 to 6 fluorine atoms are introduced, methylether to which 1 to 8 fluorine atoms are introduced, dimethoxymethane to which 1 to 8 fluorine atoms are introduced, methylpropylethers to which 1 to 10 fluorine atoms are introduced, methylbutylethers to which 1 to 12 fluorine atoms are introduced, ethylpropylethers to which 1 to 12 fluorine atoms are introduced, oxetanes to which 1 to 6 fluorine atoms are introduced, 1,3-dioxolan to which 1 to 6 fluorine atoms, tetrahydrofuran to which 1 to 8 fluorine atoms are introduced.

Examples of the fluorinated ether compound include hexafluoro dimethyl ether, pentafluoro dimethyl ether, bis(difluoromethyl)ether, fluoromethyl trifluoromethyl ether, trifluoromethyl methyl ether, perfluorodimethoxymethane, 1-trifluoromethoxy-1,1,2,2-tetrafluoroethane, difluoromethoxy pentafluoroethane, 1-trifluoromethoxy-1,2,2,2-tetrafluoroethane, 1-difluoromethoxy-1,1,2,2-tetrafluoroethane, 1-difluoromethoxy-1,2,2,2-tetrafluoroethane, 1-trifluoromethoxy-2,2,2-trifluoroethane, 1-difluoromethoxy-2,2,2-trifluoroethane, perfluorooxetane, perfluoro-1,3-dioxolan, a variety of isomers of pentafluorooxetane, and a variety of isomers of tetrafluorooxetane.

In the invention, one of the fluorinated ether compounds may be singularly used or a combination of two or more thereof may be used.

Fluorinated Alcohol Compound

According to the invention, an example of a fluorinated alcohol compound represented by the general formula (A) used as a freezer refrigerant is a fluorinated ether compound represented by the molecular formula (A) in which R is H, p is in a range of 1 to 6, q is 1 or 2, r is in a range of 1 to 13, and s is in a range of 1 to 13.

A preferable example of such a fluorinated alcohol compound is a fluorinated compound of linear or branched aliphatic alcohol having 1 to 6 carbon atoms and 1 or 2 hydroxyl groups.

The specific examples include methyl alcohol to which 1 to 3 fluorine atoms are introduced, ethyl alcohol to which 1 to 5 fluorine atoms are introduced, propyl alcohols to which 1 to 7 fluorine atoms are introduced, butyl alcohols to which 1 to 9 fluorine atoms are introduced, pentyl alcohols to which 1 to 11 fluorine atoms are introduced, ethylene glycol to which 1 to 4 fluorine atoms are introduced, and propylene glycol to which 1 to 6 fluorine atoms are introduced.

The specific examples of such a fluorinated alcohol compound include: monofluoromethyl alcohol, difluoromethyl alcohol, trifluoromethyl alcohol, isomers of difluoroethyl alcohol, isomers of trifluoroethylalcohol, isomers of tetrafluoroethyl alcohol, pentafluoroethylalcohol, isomers of difluoropropyl alcohol, isomers of trifluoropropyl alcohol, isomers of tetrafluoropropyl alcohol, isomers of pentafluoropropyl alcohol, isomers of hexafluoropropyl alcohol, heptafluoropropyl alcohol, isomers of difluorobutyl alcohol, isomers of trifluorobutyl alcohol, isomers of tetrafluorobutyl alcohol, isomers of pentafluorobutyl alcohol, isomers of hexafluorobutyl alcohol, isomers of heptafluorobutyl alcohol, isomers of octafluorobutyl alcohol, nonafluorobutyl alcohol, isomers of difluoroethylene glycol, trifluoroethylene glycol, and tetrafluoroethylene glycol. The specific examples of the fluorinated alcohol compound further include: isomers of difluoropropylene glycol, isomers of trifluoropropylene glycol, isomers of tetrafluoropropylene glycol, isomers of pentafluoropropylene glycol, fluorinated propylene glycol such as hexafluoropropylene glycol, and fluorinated trimethylene glycol that corresponds to the fluorinated propylene glycol.

In the invention, one of the fluorinated alcohol compounds may be singularly used or a combination of two or more thereof may be used.

Fluorinated Ketone Compound

An example of a fluorintate ketone compound used as a freezer refrigerant according to the invention includes a fluorinated ketone compound represented by the molecular formula (A) in which R is H, p is in a range of 2 to 6, q is 1 or 2, r is in a range of 1 to 12, and s is in a range of 0 to 11.

A preferable example of such a fluorinated ketone compound is a fluorinated compound of aliphatic ketone having 3 to 6 carbon atoms in which the alkyl group is linear or branched.

The specific examples include acetone to which 1 to 6 fluorine atoms are introduced, methylethyl ketone to which 1 to 8 fluorine atoms are introduced, diethylketone to which 1 to 10 fluorine atoms are introduced, and methylpropyl ketones to which 1 to 10 fluorine atoms are introduced.

Examples of the fluorinated ketone compound include: hexafluoro dimethyl ketone, pentafluoro dimethyl ketone, bis(difluoromethyl)ketone, fluoromethyl trifluoromethyl ketone, trifluoromethyl methyl ketone, perfluoromethyl ethyl ketone, trifluoromethyl-1,1,2,2-tetrafluoroethyl ketone, difluoromethyl pentafluoroethyl ketone, trifluoromethyl-1,1,2,2-tetrafluoroethyl ketone, difluoromethyl-1,1,2,2-tetrafluoroethyl ketone, difluoromethyl-1,2,2,2-tetrafluoroethyl ketone, trifluoromethyl-2,2,2-trifluoroethyl ketone, and difluoromethyl-2,2,2-trifluoroethyl ketone.

In the invention, one of the fluorinated ketone compounds may be singularly used or a combination of two or more thereof may be used.

Saturated Fluorohydrocarbon Compound

The saturated fluorohydrocarbon compound is a refrigerant that may be mixed, as necessary, with the fluorine-containing organic compounds, at least one of which is selected from the compounds represented by the above general formula (A).

A preferred saturated fluorohydrocarbon compound is a fluorinated compound of alkane having 1 to 4 carbon atoms. In particular, fluorinated compounds of methane and ethane having 1 or 2 carbon atoms such as trifluoromethane, difluoromethane, 1,1-difluoroethane, 1,1,1-trifluoroethane, 1,1,2-trifluoroethane, 1,1,1,2-tetrafluoroethane, 1,1,2,2-tetrafluoroehtane, 1,1,1,2,2-pentafluoroethane are favorable. The saturated fluorohydrocarbon compound may be the above-mentioned fluorinated alkane that has undergone halogenation by a halogen atom other than fluorine in addition to fluorination. An example of such a saturated fluorohydrocarbon compound includes trifluoroiodomethane ($CF_3I$). One of the saturated fluorohydrocarbon compounds may be singularly used or a combination of two or more thereof may be used.

The saturated fluorohydrocarbon compound is typically contained in the refrigerant in 30 mass % or less of the total amount of the refrigerant, preferably in 20 mass % or less and further preferably in 10 mass % or less.

The refrigerator oil composition of the invention may be added with at least one additive selected from a group consisting of an extreme pressure agent, an oiliness agent, an antioxidant, an acid scavenger, a metal deactivator and an antifoaming agent as long as an object of the invention can be achieved.

Examples of the extreme pressure agent are phosphorus-base extreme pressure agents such as phosphate ester, acid phosphate ester, phosphite ester, acid phosphite ester and amine salts thereof.

Among the above phosphorus-base extreme pressure agents, tricresyl phosphate, trithiophenyl phosphate, tri(nonylphenyl)phosphite, dioleyl hydrogen phosphite, 2-ethylhexyl diphenyl phosphite and the like are particularly preferable in view of extreme pressure properties, friction characteristics and the like.

Another example of the extreme pressure agent is a metal salt of carboxylic acid. The metal salt of carboxylic acid is preferably a metal salt of carboxylic acid having 3 to 60 carbon atoms, more preferably a metal salt of carboxylic acid having 3 to 30 carbon atoms, particularly preferably a metal salt of aliphatic acid having 12 to 30 carbon atoms. The metal salt of carboxylic acid may be a metal salt of dimer acid or trimer acid of the aliphatic acid, or a metal salt of dicarboxylic acid having 3 to 30 carbon atoms. Among the above, a metal salt of aliphatic acid having 12 to 30 carbon atoms and a metal salt of dicarboxylic acid having 3 to 30 carbon atoms are particularly preferable.

On the other hand, a metal of the metal salt is preferably an alkali metal or an alkali earth metal. Particularly, an alkali metal is suitable.

Further examples of the extreme pressure agent other than the above-listed examples are sulfur-base extreme pressure agents such as sulfurized fat and oil, sulfurized aliphatic acid, ester sulfide, olefin sulfide, dihydrocarbyl polysulfide, thiocarbamates, thioterpenes, dialkylthiodipropionates and the like.

The extreme pressure agent is contained in the composition preferably with a content of 0.001 to 10 mass % of the total amount of the composition, further preferably with a content of 0.01 to 5 mass % and particularly preferably with a content of 0.05 to 3 mass %.

One of the above extreme pressure agents may be singularly used or a combination of two or more thereof may be used.

Examples of the oiliness agent are saturated or unsaturated aliphatic monocarboxyl acid such as stearic acid or oleic acid, dimerized aliphatic acid such as dimer acid or hydrogenated dimer acid, hydroxy aliphatic acid such as ricinoleic acid or 12-hydroxystearic acid, saturated or unsaturated aliphatic monoalcohol such as lauryl alcohol or oleyl alcohol, saturated or unsaturated aliphatic monoamine such as stearylamine or oleylamine, saturated or unsaturated monocarboxyl acid amide such as lauric acid amide or oleic acid amide, partial ester of multivalent alcohol such as glycerin or sorbitol and saturated or unsaturated monocarboxyl acid, and the like.

One of the above oiliness agents may be singularly used or a combination of two or more thereof may be used. The oiliness agent is typically contained in the composition with a content of 0.01 to 10 mass % of the total amount of the composition, preferably with a content of 0.1 to 5 mass %.

Examples of the antioxidant include phenol-base antioxidant such as 2,6-di-tert-butyl-4-methylphenol, 2,6-di-tert-butyl-4-ethylphenol or 2,2'-methylenebis(4-methyl-6-tert-butylphenol) and amine-base antioxidant such as phenyl-α-naphthylamine or N,N'-diphenyl-p-phenylenediamine. In view of effects and cost, the antioxidant is typically contained in the composition with a content of 0.01 to 5 mass %, preferably with a content of 0.05 to 3 mass %.

Examples of the acid scavenger include epoxy compounds such as phenyl glycidyl ether, alkyl glycidyl ether, alkylene glycol glycidyl ether (e.g., polypropylene glycol glycidyl ether), cyclohexene oxide, α-olefin oxide and epoxidized soybean oil. Among the above, phenyl glycidyl ether, alkyl glycidyl ether, alkylene glycol glycidyl ether, cyclohexene oxide and α-olefin oxide are preferable in view of compatibility.

An alkyl group of alkyl glycidyl ether and an alkylene group of alkylene glycol glycidyl ether each may be branched, and each typically have 3 to 30 carbon atoms, preferably 4 to 24 carbon atoms, particularly preferably 6 to 16 carbon atoms. In addition, α-olefin oxide having 4 to 50 carbon atoms in total is typically used, α-olefin oxide having 4 to 24 carbon atoms in total is more preferably used, and α-olefin oxide having 6 to 16 carbon atoms in total is particularly preferably used. In the invention, one of the above acid scavengers may be singularly used or a combination of two or more thereof may be used. In view of effects and sludge prevention, the acid scavenger is typically contained in the composition with a content of 0.005 to 5 mass % of the total amount of the composition, particularly preferably with a content of 0.05 to 3 mass %.

By adding such an acid scavenger to the composition, stability of the refrigerator oil composition according to the invention can be more enhanced. By using the extreme pressure agent and the antioxidant together with the acid scavenger, the stability of the composition can be further more enhanced.

An example of the metal deactivator is N—[N',N'-dialkyl (alkyl group having 3 to 12 carbon atoms) aminomethyl] tolutriazole or the like. Examples of the antifoaming agent are silicone oil, fluorinated silicone oil and the like.

The refrigerator oil composition according to the invention preferably has viscosity at 40 degrees C. of 1 to 400 mm$^2$/s, more preferably 3 to 300 mm$^2$/s, further more preferably 5 to 200 mm$^2$/s. Volume resistivity of the composition is preferably $10^9$ Ω·cm or more, more preferably $10^{10}$ Ω·cm or more, the upper limit of which is typically approximately $10^{11}$ Ω·cm. Friction coefficient of the composition obtained through reciprocating friction test(s) is preferably 0.119 or less, more preferably 0.117 or less, further more preferably 0.112 or less, the lower limit of which is typically approximately 0.07.

In the method of lubricating a freezer that uses the refrigerator oil composition according to the invention, used amounts of the refrigerant listed above and the refrigerator oil composition are preferably in a mass ratio (i.e., a mass ratio of the refrigerant/the refrigerator oil composition) of 99/1 to 10/90, more preferably in a mass ratio of 95/5 to 30/70. When the used amount of the refrigerant is less than the above mass ratio, the freezing capability of the refrigerant is unfavorably deteriorated. On the other hand, when the used amount of the refrigerant is more than the above mass ratio, the lubricating capability of the refrigerator oil composition is unfavorably deteriorated.

Examples of a freezer (freezing system) to which the refrigerator oil composition according to the invention is preferably applied are: a freezing system that includes a compressor, a condenser, an expansion mechanism (capillary tube, expansion valve) and an evaporator as essential components; a freezing system including an ejector cycle; and a freezing system including a dryer (desiccant: natural or synthetic zeolite).

The above compressor may be open type, semi-hermetic type or hermetic type. A motor used in a hermetic-type compressor is an AC motor or a DC motor. The compressor may be a rotary compressor, a scroll compressor, a swing compressor or a piston compressor. The compressor may be a small compressor of approximately 0.2 kW or a large compressor of approximately 30 kW.

In the freezing system, a water content within the system is preferably 500 ppm by mass or less, more preferably 300 ppm by mass or less. Accordingly, a desiccant filled in the above-mentioned dryer is preferably a desiccant formed of zeolite having a pore size of 0.33 nm or smaller. The zeolite, which may be natural zeolite or synthetic zeolite, preferably has a $CO_2$ gas absorption capacity of 1.0% or less at 25 degrees C. and $CO_2$ gas partial pressure of 33 kPa. Examples of such synthetic zeolite include XH-9 (trade name) and XH-600 (trade name) manufactured by Union Showa K.K. With use of such desiccant, while water is efficiently removed without absorption of refrigerant in the refrigerating cycle, the desiccant is prevented from powderization due to deterioration. Accordingly, the choking of piping caused by powderization, abnormal wear of a slide section of the compressor caused by invasion of the powderized desiccant into the slide section of the compressor, and the like are prevented. Therefore, the freezer can be stably driven for a long time.

In addition, a partial pressure of residual air therein is preferably 13 kPa or less, more preferably 10 kPa or less and still more preferably 5 kPa or less.

The freezer to which the refrigerator oil composition according to the invention is applied includes a variety of slide portions (e.g., bearing) therein. In the invention, slide portions made of engineering plastic or slide portions having organic coating layers or inorganic coating layers are used in view of sealability.

The engineering plastic is preferably, for instance, a polyamide resin, a polyphenylene sulfide resin, a polyacetal resin or the like in view of sealability, slidability, wear resistance and the like.

The organic coating layers each are preferably, for instance, a coating layer of a fluorine-containing resin (e.g., coating layer of polytetrafluoroethylene), a coating layer of polyimide, a coating layer of polyamide-imide or the like in view of sealability, slidability, wear resistance and the like.

On the other hand, the inorganic coating layers each are preferably, for instance, a graphite layer, a diamond-like carbon layer, a nickel layer, a molybdenum layer, a tin layer, a chromium layer, a nitride layer, a boron layer or the like in view of sealability, slidability, wear resistance and the like. The inorganic coating layers each may be formed by plating, CVD (chemical vapor deposition) or PVD (physical vapor deposition).

The slide portions each may be made of conventional alloy such as Fe-based alloy, Al-based alloy or Cu-based alloy.

The base oil of the refrigerator composition according to the invention is an additive in the form of organic compounds (not including compounds from the aromatic class) having a double bond in the molecule thereof. Accordingly, a small amount of oxygen remaining in the freezer system can be scavenged, thereby preventing oxygen from reacting with the chlorofluorocarbon refrigerant. Therefore, the freezer lubricating oil composition according to the invention can be stably used for a long time in an application that employs an unsaturated chlorofluorocarbon refrigerant reactive particularly with oxygen such as an automobile air conditioner, an automobile air conditioner with electric motor driven compressor, a gas heat pump, an air conditioner, a refrigerator, a vending machine, a showcase, hot-water supply systems, or a heating and refrigerating system.

EXAMPLES

Now, the invention will be further described in detail by reference to Examples, which by no means limit the invention.

Examples 1 to 19 and Comparatives 1 to 10

Refrigerator oil compositions respectively structured as shown in Tables 1 to 3 were made, and then a sealed tube test and an autoclave test as shown below were conducted to evaluate stability of the compositions.

Sealed Tube Test: Examples 1 to 15 and Comparatives 1 to 9

A glass tube having an inner volume of 10 ml was sealed (no air) after being filled with composition/refrigerant (in a ratio of 4 g/0.5 g; no water) and a metal catalyst formed of iron, copper, and aluminum. Then, after being preserved for 5 days at a temperature of 175° C., the glass tube was visually observed for the appearance of the composition, the appearance of the catalyst, and presence or absence of sludge.

Autoclave Test: Examples 16 to 19 and Comparative 10

An autoclave having an inner volume of 200 ml was filled with composition/refrigerant (in a ratio of 30 g/10 g; 2000 mass ppm of water in the composition) and a metal catalyst formed of iron, copper, and aluminum and sealed (50 ml of air). Then, after being preserved for 90 hours at a temperature of 175° C., the autoclave was visually observed for the appearance of the composition, the appearance of the catalyst, and presence or absence of sludge, and the acid value was measured. Note that the acid value was measured by potentiometry in accordance with "Determination of neutralization number for lubricants" as defined by JIS K2501.

Note that the following two types of refrigerants were used.
1 Examples 1 to 15 and Comparatives 1 to 9
A mixture refrigerant formed of 70 mass % of HFC1234yf (2,3,3,3-tetrafluoropropene) and 30 mass % of $CF_3I$ (iodotrifluoromethane)
2 Examples 16 to 19 and Comparative 10
A mixture refrigerant formed of 96 mass % of HFC1225ye (1,2,3,3,3-pentafluoropropene) and 4 mass % of HFC32 (difluoromethane).

TABLE 1

| | | | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|---|---|
| CONTENTS (MASS %) | BASE OIL | A1 | — | — | — | — | — | — | — | — |
| | | A2 | — | — | — | — | — | 90.1 | 93.1 | 94.1 |
| | | A3 | 89.6 | 92.6 | 93.6 | 94.1 | 94.4 | — | — | — |
| | ADDITIVE | B1 | — | — | — | — | — | 1.0 | 1.0 | 1.0 |
| | | B2 | 1.0 | 1.0 | 1.0 | 1.0 | 1.0 | — | — | — |
| | | B3 | 1.2 | 1.2 | 1.2 | 1.2 | 1.2 | 1.2 | 1.2 | 1.2 |
| | | C1 | 1.5 | 1.5 | 1.5 | 1.5 | 1.5 | 1.0 | 1.0 | 1.0 |
| | | C2 | — | — | — | — | — | — | — | — |
| | | C3 | — | — | — | — | — | — | — | — |
| | | D1 | 5.0 | 2.0 | 1.0 | 0.5 | 0.2 | 5.0 | 2.0 | 1.0 |
| | | E1 | 0.5 | 0.5 | 0.5 | 0.5 | 0.5 | 0.5 | 0.5 | 0.5 |
| | | F1 | 1.2 | 1.2 | 1.2 | 1.2 | 1.2 | — | — | — |
| | | F2 | — | — | — | — | — | — | — | — |
| | | F3 | — | — | — | — | — | 1.2 | 1.2 | 1.2 |
| | TOTAL | | 100 | 100 | 100 | 100 | 100 | 100 | 100 | 100 |
| SEALED TUBE TEST | OIL APPEARANCE | | GOOD | GOOD | GOOD | GOOD | PALE YELLOW | GOOD | GOOD | GOOD |
| | CATALYST | | Cu | Cu | Cu | Cu | Cu | Cu | Cu | Cu |

TABLE 1-continued

|  | | | | | | | | |
|---|---|---|---|---|---|---|---|---|
| APPEARANCE | COLOR CHANGE | COLOR CHANGE | COLOR CHANGE | COLOR CHANGE | COLOR CHANGE | COLOR CHANGE | COLOR CHANGE | COLOR CHANGE |
| SLUDGE GENERATION | NONE | NONE | NONE | NONE | NONE | NONE | NONE | NONE |

|  |  |  | EXAMPLE 9 | EXAMPLE 10 | EXAMPLE 11 | EXAMPLE 12 | EXAMPLE 13 | EXAMPLE 14 | EXAMPLE 15 |
|---|---|---|---|---|---|---|---|---|---|
| CONTENTS (MASS %) | BASE OIL | A1 | — | — | 91.1 | 94.1 | 95.1 | 95.6 | 95.9 |
|  |  | A2 | 94.6 | 94.9 | — | — | — | — | — |
|  |  | A3 | — | — | — | — | — | — | — |
|  | ADDITIVE | B1 | 1.0 | 1.0 | — | — | — | — | — |
|  |  | B2 | — | — | — | — | — | — | — |
|  |  | B3 | 1.2 | 1.2 | 1.2 | 1.2 | 1.2 | 1.2 | 1.2 |
|  |  | C1 | 1.0 | 1.0 | 1.0 | 1.0 | 1.0 | 1.0 | 1.0 |
|  |  | C2 | — | — | — | — | — | — | — |
|  |  | C3 | — | — | — | — | — | — | — |
|  |  | D1 | 0.5 | 0.2 | 5.0 | 2.0 | 1.0 | 0.5 | 0.2 |
|  |  | E1 | 0.5 | 0.5 | 0.5 | 0.5 | 0.5 | 0.5 | 0.5 |
|  |  | F1 | — | — | — | — | — | — | — |
|  |  | F2 | — | — | — | — | — | — | — |
|  |  | F3 | 1.2 | 1.2 | 1.2 | 1.2 | 1.2 | 1.2 | 1.2 |
|  | TOTAL |  | 100 | 100 | 100 | 100 | 100 | 100 | 100 |
| SEALED TUBE TEST | OIL APPEARANCE |  | GOOD | PALE YELLOW | GOOD | GOOD | GOOD | GOOD | PALE YELLOW |
|  | CATALYST APPEARANCE |  | Cu COLOR CHANGE | Cu COLOR CHANGE | Cu COLOR CHANGE | Cu COLOR CHANGE | Cu COLOR CHANGE | Cu COLOR CHANGE | Cu COLOR CHANGE |
|  | SLUDGE GENERATION |  | NONE | NONE | NONE | NONE | NONE | NONE | NONE |

TABLE 2

|  |  |  | COMPARATIVE 1 | COMPARATIVE 2 | COMPARATIVE 3 | COMPARATIVE 4 | COMPARATIVE 5 | COMPARATIVE 6 | COMPARATIVE 7 | COMPARATIVE 8 | COMPARATIVE 9 |
|---|---|---|---|---|---|---|---|---|---|---|---|
| CONTENTS (MASS %) | BASE OIL | A1 | 100 | — | — | — | — | 96.1 | — | — | 96.4 |
|  |  | A2 | — | 100 | — | — | 95.1 | — | — | 96.1 | — |
|  |  | A3 | — | — | 100 | 94.6 | — | — | 95.7 | — | — |
|  | ADDITIVE | B1 | — | — | — | — | 1.0 | — | — | 1 | — |
|  |  | B2 | — | — | — | 1.0 | — | — | 0.3 | — | — |
|  |  | B3 | — | — | — | 1.2 | 1.2 | 1.2 | 0.9 | 1.2 | 1.2 |
|  |  | C1 | — | — | — | 1.5 | 1.0 | 1.0 | — | — | — |
|  |  | C2 | — | — | — | — | — | — | — | — | 0.7 |
|  |  | C3 | — | — | — | — | — | — | 1.5 | — | — |
|  |  | D1 | — | — | — | — | — | — | — | — | — |
|  |  | E1 | — | — | — | 0.5 | 0.5 | 0.5 | 0.5 | 0.5 | 0.5 |
|  |  | F1 | — | — | — | 1.2 | — | — | 1 | — | — |
|  |  | F2 | — | — | — | — | — | — | 0.1 | — | — |
|  |  | F3 | — | — | — | — | 1.2 | 1.2 | — | 1.2 | 1.2 |
|  | TOTAL |  | 100 | 100 | 100 | 100 | 100 | 100 | 100 | 100 | 100 |
| SEALED TUBE TEST | OIL APPEARANCE |  | BLACK | BLACK | BLACK | DARK YELLOW | YELLOW | PALE BROWN | BROWN | YELLOW | PALE BROWN |
|  | CATALYST APPEARANCE |  | Fe BLACK Al Cu COLOR LITTLE | Fe BLACK Al Cu COLOR LITTLE | Fe BLACK Al Cu COLOR LITTLE | Cu COLOR CHANGE | Cu COLOR CHANGE | Cu COLOR CHANGE | Fe Cu Al COLOR CHANGE | Fe Cu COLOR CHANGE | Cu COLOR CHANGE |
|  | SLUDGE GENERATION |  | LITTLE | LITTLE | LITTLE | NONE | NONE | NONE | NONE | NONE | NONE |

TABLE 3

|  |  |  | EXAMPLE 16 | EXAMPLE 17 | EXAMPLE 18 | EXAMPLE 19 | COMPARATIVE 10 |
|---|---|---|---|---|---|---|---|
| CONTENTS (MASS %) | BASE OIL | A3 | 96.3 | 94.8 | 91.3 | 89.8 | 96.8 |
|  | ADDITIVE | B2 | 0.3 | 0.3 | 0.3 | 0.3 | 0.3 |
|  |  | B3 | 0.9 | 0.9 | 0.9 | 0.9 | 0.9 |
|  |  | C3 | 1.5 | 1.5 | 1.5 | 1.5 | 1.5 |
|  |  | C4 | — | — | 5.0 | 5.0 | — |
|  |  | D2 | 0.5 | 2.0 | 0.5 | 2.0 | — |
|  |  | E1 | 0.5 | 0.5 | 0.5 | 0.5 | 0.5 |
|  | TOTAL |  | 100 | 100 | 100 | 100 | 100 |
| SEALED TUBE TEST | OIL APPEARANCE |  | YELLOW | YELLOW | YELLOW | YELLOW | YELLOW |
|  | CATALYST APPEARANCE |  | GOOD | GOOD | GOOD | GOOD | GOOD |
|  | SLUDGE GENERATION |  | NONE | NONE | NONE | NONE | NONE |
| ACID VALUE (mgKOH/g) |  |  | 0.29 | 0.17 | 0.06 | 0.11 | 0.45 |

Remarks

All of the base oil used was polyalkylene glycol polymer (PAG), which will be specifically shown below.

A1: Me-PO/EO-Me (polyoxypropylene polyoxyethylene copolymer dimethyl ether, a molar ratio of PO/EO 9:1), kinematic viscosity at 40 degrees C. 44.5 mm²/s, kinematic viscosity at 100 degrees C. 10.0 mm²/s A2: Me-PO-Me: polypropylene glycol dimethyl ether, kinematic viscosity at 40 degrees C.: 50.7 mm²/s, kinematic viscosity at 100 degrees C.: 10.8 mm²/s A3: Me-PO-Me: polypropylene glycol dimethyl ether, kinematic viscosity at 40 degrees C.: 44.0 mm²/s, kinematic viscosity at 100 degrees C.: 9.6 mm²/s Additives added to base oil are as follows.

Phosphate Extreme Pressure Agent

B1: B1: dioleyl hydrogen phosphite (amount of phosphorous: 5.34 mass %)

B2: tris(nonylphenyl)phosphite

B3: TCP (tricresyl phosphate)

Epoxy Acid Scavenger

C1: α-olefin epoxide (C-12, 14)

C2: 3,4-diepoxycyclohexylmethyl-3,4-epoxycyclohexanecarboxylate

C3: α-olefin epoxide (C-16)

C4: PPG-DGE (polypropylene glycol glycidyl ether)

Unsaturated Organic Compound

D1: α-farnesene

D2: 1-hexadecene ($C_{16}H_{32}$)

Antioxidant

E1: DBPC (2,6-di-tert-butyl-4-methylphenol)

Other Additives

F1: oleic acid potassium

F2: N-dialkyl amino methyl benzotriazole

F3: sorbitan monooleate

Evaluation Result

Examples 1 to 15 shown in Table 1 are results of sealed test tube tests in which lubricating oil composition containing α-farnesene (unsaturated organic compound) is mixed with a refrigerant. In this case, appearances of the compositions were normal, and colors of the catalysts did not change except that of Cu. Sludge was not generated. Comparatives shown in Table 2 are arrangements solely consisting of base oil. Comparatives 4 to 9, which had the same composition arrangements as the Examples except that α-farnesene was not added, showed notable deterioration in the appearances of the compositions and the catalysts in the sealed tube tests. It was also known that the presence of the extreme pressure agent or the acid scavenger did not show a noteworthy effect other than prevention of sludge generation.

Examples 16 to 19 in Table 3 show results of autoclave tests in which lubricating oil composition containing 1-hexadecene (unsaturated organic compound) was mixed with a refrigerant. In all of the arrangements, appearances of the compositions were substantially normal, and colors of the catalysts showed no change. Comparative 10 had the same composition arrangements as Examples 16 and 17 except that 1-hexadecene was not added in Comparative 10. In the autoclave test conducted with such an arrangement, appearances of the composition was substantially normal, and colors of the catalysts did not show change. However, it was known from the great increase in the acid value that the base oil was greatly deteriorated by reacting with oxygen.

It can be concluded from the results set forth above that the lubricating oil composition for refrigerator to which an unsaturated organic compound is added according to the invention can be stably used for a long time in the presence of oxygen.

Industrial Applicability

The present invention can provide a lubricating oil composition for refrigerator with excellent stability even when a refrigerant having an unstable structure such as unsaturated fluorohydrocarbon compound is used.

The invention claimed is:

1. A lubricating oil composition for a refrigerator, comprising: a base oil; and an additive added to the base oil, wherein
the base oil is at least one compound selected from the group consisting of alkyl naphthalene, polycarbonate, an ether-base compound represented by formula (1) and a polyalkylene glycol represented by formula (3), $$Ra—[(ORb)n-(B)—(ORc)k]x-Rd \quad (1)$$

where: Ra and Rd each represent a hydrogen atom, an alkyl group having 1 to 10 carbon atoms, an acyl group having 2 to 10 carbon atoms or a hydrocarbon group having 2 to 6 bonding sites and 1 to 10 carbon atoms; Rb and Rc each represent an alkylene group having 2 to 4 carbon atoms; n and k each represent an integer in a range of 0 to 20; x represents an integer in a range of 1 to 6; and (B) represents a polymerization site comprising 3 or more monomer units each represented by formula (2)

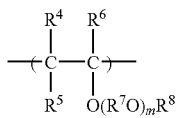 (2)

where: $R^4$, $R^5$ and $R^6$ each represent a hydrogen atom or a hydrocarbon group having 1 to 8 carbon atoms, $R^4$, $R^5$ and $R^6$ being mutually the same or different; $R^7$ represents a divalent hydrocarbon group having 1 to 10 carbon atoms or divalent ether-bonded oxygen-containing hydrocarbon group having 2 to 20 carbon atoms; $R^8$ represents a hydrogen atom, or a hydrocarbon group having 1 to 20 carbon atoms; m represents a number whose average value is in a range of 0 to 10; when m is plural, plural m are mutually the same or different per each unit; $R^4$ to $R^8$ each are mutually the same or different per each unit; when $R^7O$ is plural, plural $R^7O$ are mutually the same or different; and when both k and n in the formula (1) are 0, m is an integer of 1 or larger in the formula (2), $$R^9-[(OR^{10})_{m1}-OR^{11}]_{n1} \quad (3)$$

where: $R^9$ represents an alkyl group having 1 to 10 carbon atoms, an acyl group having 2 to 10 carbon atoms or an aliphatic hydrocarbon group having 2 to 6 bonding sites and 1 to 10 carbon atoms, $R^{10}$ represents an alkylene group having 2 to 4 carbon atoms, $R^{11}$ represents an alkyl group having 1 to 10 carbon atoms or an acyl group having 2 to 10 carbon atoms, n1 represents an integer in a range of 1 to 6, and m1 represents a number that is determined such that the average value of m1 multiplied by n1 is in a range of 6 to 80, and the additive is selected from the group consisting of 1-tetradecene, 1-hexadecene, and 1-octadecene.

2. A refrigerant, comprising the lubricating oil composition for a refrigerator according to claim 1, wherein the refrigerant comprises: at least one of fluorine-containing organic compounds selected from the group consisting of compounds represented by following molecular formula (A); or a combination of fluorine-containing organic compound and saturated fluorohydrocarbon compound, $$C_pO_qF_rR_s \quad (A)$$

where: R represents a Cl, Br, I or hydrogen atom, p is an integer in a range of 1 to 6, q is an integer in a range of 0 to 2, r is an integer in a range of 1 to 14, and s is an integer in a range of 0 to 13; and if q is 0, p is in a range of 2 to 6, and the molecule comprises at least one carbon-carbon unsaturated bond.

3. The refrigerant according to claim 2, wherein the compound represented by the molecular formula (A) is a compound represented by at least one of molecular formulae $C_3HF_5$, $C_3H_2F_4$, and $C_3H_3F_3$.

4. The lubricating oil composition for a refrigerator according to claim 1, wherein the base oil is further added with at least one additive selected from the group consisting of an extreme pressure agent, an oiliness agent, an antioxidant, an acid scavenger, a metal deactivator and an antifoaming agent.

5. The lubricating oil composition for a refrigerator according to claim 1, wherein a slide portion of the refrigerator comprises an engineering plastic, an organic coating layer, or an inorganic coating layer.

6. The lubricating oil composition for a refrigerator according to claim 5, wherein the slide portion comprises an organic coating layer and the organic coating layer is a coating layer of polytetrafluoroethylene, a coating layer of polyimide, a coating layer of polyamide-imide or a thermosetting insulating layer comprising a resin paint comprising: a resin base material comprising polyhydroxyether resin and polysulfone-base resin; and a cross-linker.

7. The lubricating oil composition for a refrigerator according to claim 5, wherein the slide portion comprises an inorganic coating layer and the inorganic coating layer is a graphite layer, a diamond-like carbon layer, a tin layer, a chromium layer, a nickel layer, or a molybdenum layer.

8. A heating/cooling system comprising the lubricating oil composition for a refrigerator according to claim 1.

9. The system according to claim 8, wherein a water content within the system is 500 ppm by mass or less while a residual air partial pressure is 13 kPa or less.

10. The lubricating oil composition for a refrigerator according to claim 1, wherein the additive is 1-hexadecene.

11. The lubricating oil composition for a refrigerator according to claim 1, wherein the additive is 1-tetradecene.

12. The lubricating oil composition for a refrigerator according to claim 1, wherein the additive is 1-octadecene.

* * * * *